Aug. 17, 1965    K. MÜLLER ETAL    3,200,703
FOUR-LENS OBJECTIVE WITH ANASTIGMATIC IMAGE FORMATION
Filed April 6, 1961    2 Sheets-Sheet 1

INVENTORS
Karl Müller
Friedrich Ueberhagen
BY Blum, Moscovitz,
Friedman & Blum
ATTORNEYS United States Patent Office 3,200,703
Patented Aug. 17, 1965

3,200,703
FOUR-LENS OBJECTIVE WITH ANASTIGMATIC IMAGE FORMATION
Karl Müller, Grone uber Gottingen, and Friedrich Ueberhagen, Braunschweig, Germany, assignors to Voigtlander A.G., Braunschweig, Germany, a corporation of Germany
Filed Apr. 6, 1961, Ser. No. 101,207
Claims priority, application Germany, Apr. 16, 1960, V 18,453
7 Claims. (Cl. 88—57)

This invention relates to four lens photographic objectives of the type having a relative aperture rating between 1:2.8 and 1:2.3 and arranged for mounting externally of a camera.

Objectives of this type include, adjacent the diaphragm, a biconcave dispersion lens whose opposite surfaces have different radii of curvature. In advance of this dispersion lens, toward the longer conjugate, there are two condensing lenses whose opposite surfaces have different radii of curvature, and, on the side of the dispersion lens toward the shorter conjugate, there is a positive lens whose opposite surfaces have different radii of curvature. The more sharply curved surfaces of the first three lenses are convex toward the longer conjugate, whereas the more sharply curved surface of the last lens is convex toward the shorter conjugate.

Known objectives of this type (e.g. Sonnefeld DRP 535,197 and U.S. Patent No. 1,825,828) are so designed that the outer lens nearest the longer conjugate has about the same positive refraction index as that of the condenser lens immediately adjacent the surface thereof facing toward the diaphragm. These prior proposals relate to objectives which are suitable for relatively small image angles as, for light rays entering the objective at an angle in excess of about 15 to 17 degrees to the optical axis of the objective, there is a pronounced tendency toward undercorrection for the image curvature, producing astigmatism which increases progressively with an increasing image angle.

A previous effort has been made to reduce the image errors by designing the lens nearest the shorter conjugate as a doublet with a convex, sharply curved, condensing cement surface. This expedient, however, provides an objective which is unattractive from the manufacturing standpoint as well as from the cost standpoint, while at the same time departing from the four-lens design.

The present invention obviates the shortcomings of known four-lens objectives, and provides a four-lens objective having an illumination strength equal to similar prior art objectives but covering a useful image field of about 50 degrees. More particularly, this is effected by a novel distribution of the refractive powers of the several lenses in conjunction with a novel dimensioning of the refractive surfaces of the first three lenses of the objective as considered in the direction proceeding from the longer conjugate toward the shorter conjugate.

The outer surface of the first lens has a refractive power which is in excess of 10 percent, but less than 50 percent, of the refractive power of the convex outer surface of the second condenser lens. This second condenser lens is, additionally, separated axially from the dispersion lens to provide an air gap having the form of a condensing lens with opposite surfaces of unequal radii of curvature, this air gap thus acting as a dispersing air lens. Contrary to prior art teaching, the air lens further is designed so that its more sharply curved surface is convex and faces the side of the shorter conjugate. The outer face of the dispersion lens, facing toward the longer conjugate and acting as one boundary for the air lens, has a radius of curvature which not only is smaller than that of the convex surface of the lens nearest the side of the shorter conjugate and facing toward the longer conjugate, but also is smaller than the arithmetical mean value of the lengths of the radii of the convex outer surfaces of the two condensing lenses which precede the air gap or air lens.

Four-lens objectives embodying the invention thus differ radically in design from those of the known prior art. In the case of known multi-lens objectives (Ernostar, DRP 428,657), the lens furthest from the diaphragm toward the side of the longer conjugate has a maximum positive refractive power. In the case of these prior art objectives, as well as in the case of others (Richter, British Patent No. 496,865; Meyer: DRGM 1,387,593; Warmisham, U.S. Patent No. 2,270,235; Altman, U.S. Patents Nos. 2,343,629 and 2,767,614; and Creighton, U.S. Patent No. 2,432,387) the more sharply curved boundary surface of the air gap is nearer to the longer conjugate. The particular design of the air gap, in objectives embodying the invention, eliminates the sharp increase of astigmatism with increasing image angles which was hitherto unavoidable in prior art four-lens objectives.

The other important feature of the invention, which is that of providing the lower positive refractive power to the outer face of the first condensing lens in the direction of the longer conjugate, and the maximum positive refractive power to the outer face of the next adjacent condenser lens, has the advantage of achieving a better image curvature, with the further advantage that the effect of the outer lens on the image definition becomes, to a great extent, independent of its refractive power. This lens, which is the largest diameter lens of the objective, can therefore be produced from a simple, and thus inexpensive, glass.

In the course of development of the present invention, it has been found to be important to impart to the two front condenser lenses refractive powers such that the sum of their surface refractive powers will be higher than 115 percent, but less than 230 percent, of the equivalent refractive power of the objective. This makes it possible to attain a very elongated course for the middle image curvature. It has further been found, independently of this, that the intermediate deflections of the astigmatic setting differences over a large image field can be favorably influenced by providing that those surfaces of the first three lenses having the greater radius of curvature have surface refractive powers of a magnitude such that the absolute value of their sum is at least ⅔ but less than twice the equivalent refractive power of the objective. These last two factors can be used conjointly to good advantage in the present invention, so as to improve both the image curvature as well as the astigmatic properties throughout a relatively large image field.

For an understanding of the principles of the invention, reference is made to the following description of typical embodiments thereof as illustrated in the accompanying drawings. In the drawings.

In each of the figures of the drawings, the objectives shown have a focal length of $f=200$ mm., and the references applied to the several lenses coincide with the corresponding references in the tables hereinafter. Thus, R designates the radii of curvature of the surfaces of the lenses L, while $d$ indicates the axial thickness of the lenses and $a$ the axial air gaps or spacing therebetween. The types of glass employed are characterized by the refractive indices $n$, and their color dispersions by means of the Abbe number $v$ (nu). The numerical designation of the components is in an ascending sequence from the longer conjugate to the shorter conjugate.

Figure 1:
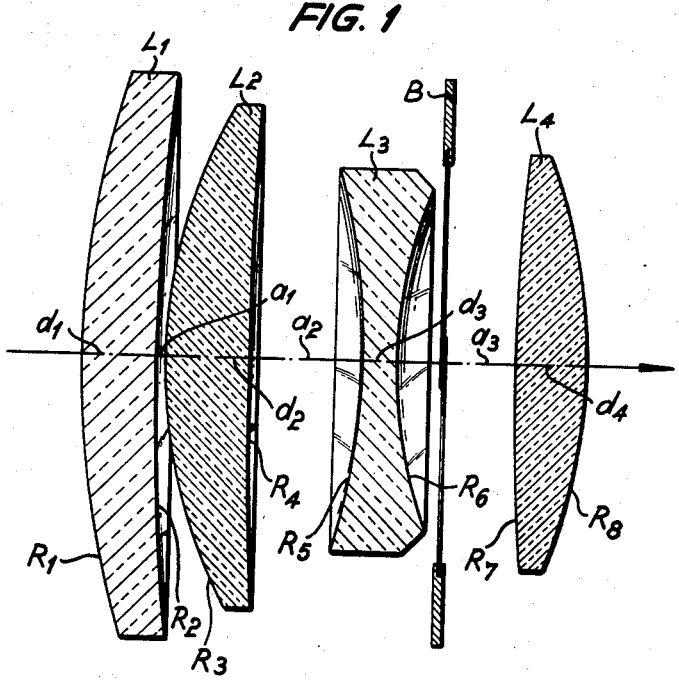
FIG. 1 is an axial sectional view through an objective embodying the invention and primarily useful in photography.

The data appearing in the examples hereinafter has particular reference to the embodiment of the invention shown in FIG. 1, except for the fourth example which is particularly related to the embodiment of the invention shown in FIG. 2.

Figure 3:
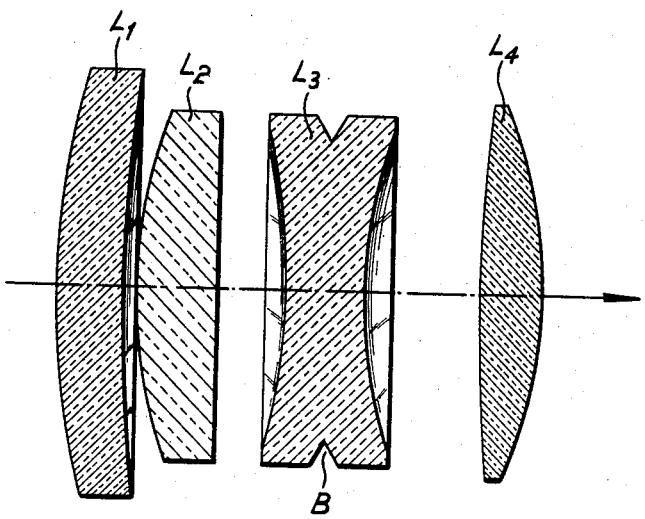
FIG. 3 is an axial sectional view of a further objective embodying the invention and particularly useful with projectors.

In the embodiment of the invention shown in FIG. 3, and which is particularly useful as the objective of a projector, it is expedient to make the intermediate lenses $L_2$ and $L_3$ equal in diameter. Since the objectives of projectors are generally used with a stationary diaphragm, such stationary diaphragm may be positioned on a lens. In such event, the lens designated as the holder for the diaphragm, for example the lens $L_3$, is provided with an annular or peripheral groove, having a predominantly wedge shape cross section, and which is preferably veneered with a coat of black varnish.

In the following tables representing specific embodiments of the invention, the figures given are for a focal length of $f=100$ mm., so that all length measurements are therefore expressed in millimeters.

*Example 1*

In this embodiment of the invention, the lenses are made of ordinary types of glass with refractive indices ranging from 1.6 to 1.7, the glasses in the direction of light rays through the objective as indicated by the arrows, being in the following order:

| Type of glass: | Refraction index |
|---|---|
| Baryta—heavy crown | 1.61 |
| Heaviest crown | 1.66 |
| Heavy flint | 1.65 |
| Heavy crown | 1.62 |

In this embodiment, the refractive indices, proceeding in the direction of light rays through the objective, first increase and then gradually decrease in value. The objective has a relative aperture of 1:2.7, and the following physical data:

[$f=100$ mm.  1:2.7.  $s'=81$ mm.]

| | | | |
|---|---|---|---|
| $R_1=+116.31$ | $d_1=5.59$ | $n_1=1.610$ | $v_1=58.9$ |
| $R_2=+144.26$ | $a_1=0.23$ | | |
| $R_3=+41.38$ | | | |
| $R_4=-563.55$ | $d_2=6.10$ | $n_2=1.658$ | $v_2=50.8$ |
| $R_5=-54.00$ | $a_2=8.27$ | | |
| $R_6=+42.08$ | $d_3=1.28$ | $n_3=1.649$ | $v_3=33.8$ |
| $R_7=+713.41$ | $a_3=11.02$ | | |
| $R_8=-39.92$ | $d_4=6.47$ | $n_4=1.620$ | $v_4=60.3$ |

The refractive powers $\varphi$ of the individual surfaces, in ascending numerical sequence of the surfaces in the direction of light rays through the objective, are as follows:

$\varphi_1=+0.524\Phi$
$\varphi_2=-0.423\Phi$
$\varphi_3=+1.590\Phi$
$\varphi_4=+0.117\Phi$
$\varphi_5=-1.202\Phi$
$\varphi_6=-1.542\Phi$
$\varphi_7=+0.087\Phi$
$\varphi_8=+1.553\Phi$ where $\Phi$ is the equivalent refractive power of the objective. From the foregoing, it will be noted that $\varphi_1=0.33\varphi_3$, and is thus between 10 percent and 50 percent of $\varphi_3$. The sum of the surface refractive powers of the first four lens surfaces is $1.81\Phi$, and is therefore between $1.15\Phi$ and $2.30\Phi$. The sum of $(\varphi_2+\varphi_4+\varphi_5)$ is $-1.51\Phi$, its absolute value ranges between $0.67\Phi$ and $2.0\Phi$.

$R_1=116.31$
$R_3=41.38$ $Sa=157.69/2=78.845$, the arithmetical mean.
$-R_5=54.00$, and is thus lower than $R_1$ and also lower than 78.845.

*Example 2*

In this example glasses are employed having refraction indices increasing above 1.7. The glass selected for the front lens has a refractive index of less than 1.6. The relative aperture of this objective is 1:2.5, which corresponds to an effective aperture diameter of $0.40f$. Its physical data are as follows:

[$f=100$ mm.  1:2.5.  $s'=78$ mm.]

| | | | |
|---|---|---|---|
| $R_1=+146.94$ | $d_1=7.4535$ | $n_1=1.5890$ | $v_1=61.0$ |
| $R_2=+198.05$ | $a_1=0.5324$ | | |
| $R_3=+47.916$ | | | |
| $R_4=+1,064.8$ | $d_2=8.5183$ | $n_2=1.6930$ | $v_2=53.3$ |
| $R_5=-67.082$ | $a_2=10.648$ | | |
| $R_6=+47.916$ | $d_3=3.7268$ | $n_3=1.7050$ | $v_3=30.1$ |
| $R_7=+198.05$ | $a_3=11.180$ | | |
| $R_8=-51.429$ | $d_4=6.9211$ | $n_4=1.7300$ | $v_4=44.5$ |

The refractive powers $\varphi$ of the individual lens surfaces of this example are as follows:

$\varphi_1=+0.401\Phi$
$\varphi_2=-0.295\Phi$
$\varphi_3=+1.438\Phi$
$\varphi_4=-0.065\Phi$
$\varphi_5=-1.060\Phi$
$\varphi_6=-1.479\Phi$
$\varphi_7=+0.365\Phi$
$\varphi_8=+1.431\Phi$ Hence:

$\varphi_1=0.279\varphi_3$, and thus ranges between 10% and 50% of $\varphi_3$.

The sum of the surface refractive powers of the first four lens surfaces is $1.479\Phi$, and thus ranges between $1.15\Phi$ and $2.30\Phi$.

The sum of $(\varphi_2+\varphi_4+\varphi_5)$ is $-1.42\Phi$. Its absolute value ranges between $0.67\Phi$ and $2.0\Phi$.

$R_1=146.94$
$R_3=47.92$ $Sa=194.86/2=97.43$, the arithmetical mean.
$-R_5=67.082$, is thus lower than $R_1$, and also lower than 97.43.

*Example 3*

In this objective, as distinguished from the examples cited before, the front lens is produced of highly brittle glass, with a refractive index in excess of 1.7. This type of design exemplifies that the rear positive lens $L_4$ does not necessarily have to be made of a glass superior to that of the front lens $L_1$. To emphasize the wide range of choices, with respect to glass, afforded by virtue of the invention, all the other lenses in this example are made of one type of glass.

[$f$=100 mm.   1:2.4.   $s'$=77 mm.]

| | | | |
|---|---|---|---|
| $R_1$=+160.45 | $d_1$=7.488 | $n_1$=1.7257 | $\nu_1$=50.3 |
| $R_2$=+218.86 | $a_1$=0.535 | | |
| $R_3$=+48.136 | $d_2$=8.557 | $n_2$=1.6892 | $\nu_2$=54.6 |
| $R_4$=+1,069.7 | $a_2$=10.697 | | |
| $R_5$=−63.12 | $d_3$=3.744 | $n_3$=1.6983 | $\nu_3$=30.0 |
| $R_6$=+50.84 | $a_3$=11.232 | | |
| $R_7$=+218.86 | $d_4$=5.0 | $n_4$=1.7257 | $\nu_4$=50.3 |
| $R_8$=−51.02 | | | |

The refraction indices $\varphi$ of the individual lens surfaces are as follows:

$$\varphi_1 = +0.452\Phi$$
$$\varphi_2 = -0.332\Phi$$
$$\varphi_3 = +1.432\Phi$$
$$\varphi_4 = -0.064\Phi$$
$$\varphi_5 = -1.106\Phi$$
$$\varphi_6 = -1.374\Phi$$
$$\varphi_7 = +0.332\Phi$$
$$\varphi_8 = +1.422\Phi$$

where $\Phi$ is the equivalent refractive power of the complete objective.

In this example:

$\varphi_1 = 0.316\varphi_3$, which is between 10% and 50% of $\varphi_3$.
The sum of the surface refractive powers of the first four lens surfaces is 1.49$\Phi$, and thus is in the range between 1.15$\Phi$ and 2.30$\Phi$.
The sum ($\varphi_2 + \varphi_4 + \varphi_5$) is −150$\Phi$. Its absolute value is thus between 0.67$\Phi$ and 2.0$\Phi$.

$R_1$ = +160.45
$R_3$ = + 48.136

$Sa$ = 208.586/2 = 104.293, the arithmetical mean.
−$R_5$ = 63.12, and hence is lower than $R_1$ and also lower than 104.293.

Example 4

Figure 2:
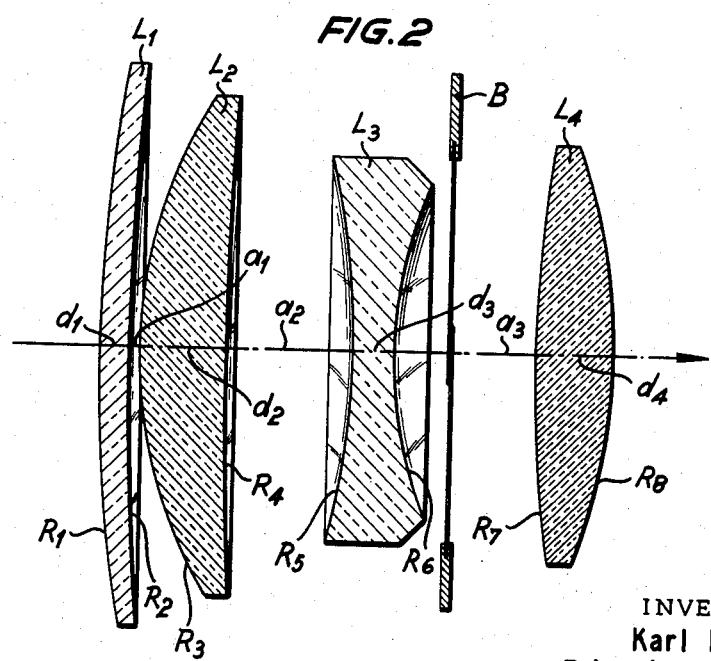
FIG. 2 is an axial section view through another objective embodying the invention and differing from the objective of FIG. 1 in that the first lens, proceeding from the longer conjugate to the shorter conjugate, has a minimum thickness.

In this embodiment of the objective, which has the general appearance shown in FIG. 2, the front lens $L_1$ not only has the least thickness along the optical axis but it also has the lowest refractive power of any lens of the objective. As in Example 2, the indices of refraction of the glasses increase from the side of the longer conjugate to the side of the shorter conjugate. However, in contrast to Example 2, only medium heavy glass is employed, the sum total of the refractive indices for the yellow $d$-line of the helium spectrum being less than 1.70. An objective in accordance with this example has the following physical properties:

[$f$=100 mm.   1:2.4.   $s'$=76 mm.]

| | | | |
|---|---|---|---|
| $R_1$=+156.27 | $d_1$=2.71 | $n_1$=1.5687 | $\nu_1$=63.1 |
| $R_2$=+286.75 | $a_1$=1.01 | | |
| $R_3$=+45.16 | $d_2$=8.64 | $n_2$=1.6211 | $\nu_2$=62.1 |
| $R_4$=+502.61 | $a_2$=12.26 | | |
| $R_5$=−80.38 | $d_3$=4.22 | $n_3$=1.6483 | $\nu_3$=33.8 |
| $R_6$=+39.91 | $a_3$=13.16 | | |
| $R_7$=+130.75 | $d_4$=7.44 | $n_4$=1.6935 | $\nu_4$=53.4 |
| $R_8$=−56.19 | | | |

The refraction indices $\varphi$ of the individual lens surfaces are as follows:

$$\varphi_1 = +0.364\Phi$$
$$\varphi_2 = -0.198\Phi$$
$$\varphi_3 = +1.376\Phi$$
$$\varphi_4 = -0.124\Phi$$
$$\varphi_5 = -0.807\Phi$$
$$\varphi_6 = -1.624\Phi$$
$$\varphi_7 = +0.530\Phi$$
$$\varphi_8 = +1.234\Phi$$

where $\Phi$ is the equivalent refractive power of the complete objective.

Here again:

$\varphi_1 = 0.26\varphi_3$, and thus is between 10% and 50% of $\varphi_3$.
The sum of the surface refractive powers of the first four lens surfaces is 1.42$\Phi$, and thus has between 1.15$\Phi$ and 2.30$\Phi$.
The sum ($\varphi_2 + \varphi_4 + \varphi_5$) is −1.13$\Phi$, and thus is between 0.67$\Phi$ and 2.0$\Phi$.

$R_1$ = +156.27
$R_3$ = + 45.16

$Sa$ = 201.43/2 = 1000.715, the arithmetical mean.
−$R_5$ = 80.38, and is lower than $R_1$, and also lower than 100.715.

While specific embodiments of the invention have been shown and described in detail to illustrate the application of the principles of the invention, it will be understood that the invention may be embodied otherwise without departing from such principles.

What is claimed is:

1. A four-lens objective with anastigmatic imaging comprising, proceeding from the longer conjugate toward the shorter conjugate, first and second air-separated single lenses of positive power having opposite surfaces of unequal radii of curvature, a single third and biconcave dispersion lens, having opposite surfaces of unequal radii of curvature, adjacent the diaphragm, and a fourth single lens of positive power having opposite surfaces of unequal radii of curvature, the more sharply curved surfaces of the first, second, and third lenses being convex toward the longer conjugate, while the more sharply curved surface of the fourth lens is convex toward the shorter conjugate; the refractive power of the outer surface ($R_1$) of the first and meniscus shaped lens ($L_1$) being greater than 10% but less than 50% of the refractive power of the outer surface ($R_3$) of the second lens ($L_2$); the second lens being separated from the third lens ($L_3$) by an air gap having the shape of a condensing lens with its rear surface being the more sharply curved of the two enclosing and opposite surfaces of unequal radii of curvature, and thus acting as a dispersing air lens; the surface ($R_5$) of said air gap toward the shorter conjugate being concave toward the longer conjugate and having a radius of curvature less than the arithmetical mean value $$\frac{(R_1 + R_3)}{2}$$

of the radii of the outer surfaces ($R_1$ and $R_3$) of the first and second lenses and also less than the radius of curvature of the outer surface ($R_1$) of the first lens; the outer surfaces of both the first and second lenses being convex toward the longer conjugate the sum of the refractive powers of the surfaces of the first and second lenses being greater than 115% but less than 230% of the equivalent refractive power of the objective; the sum of the refractive powers of the second, fourth and fifth lens surfaces, considered in ascending numerical order from the longer conjugate toward the shorter conjugate, and which are the less sharply curved surfaces of said first, second and third lenses, having an absolute value greater than two-thirds but less than twice the equivalent refractive power of the objective.

2. An objective as claimed in claim 1 wherein, for a focal length of $f=100$ mm. and wherein the radii of curvature may vary by ±20% and the surface refractive powers of the lens by ±20%, the objective has the following physical data:

| | | | |
|---|---|---|---|
| $R_1=+116.31$ | $d_1=5.59$ | $n_1=1.610$ | $\nu_1=58.9$ |
| $R_2=+144.26$ | $a_1=0.23$ | | |
| $R_3=+41.38$ | $d_2=6.10$ | $n_2=1.658$ | $\nu_2=50.8$ |
| $R_4=-563.55$ | $a_2=8.27$ | | |
| $R_5=-54.00$ | $d_3=1.28$ | $n_3=1.649$ | $\nu_3=33.8$ |
| $R_6=+42.08$ | $a_3=11.02$ | | |
| $R_7=+713.41$ | $d_4=6.47$ | $n_4=1.620$ | $\nu_4=60.3$ |
| $R_8=-39.92$ | | | |

3. An objective as claimed in claim 1 in which, for a focal length of $f=100$ mm. and wherein the radii of curvature may vary by ±20% and the surface refractive powers by ±20%, the objective has the following physical data:

| | | | |
|---|---|---|---|
| $R_1=+146.94$ | $d_1=7.4535$ | $n_1=1.5890$ | $\nu_1=61.0$ |
| $R_2=+198.05$ | $a_1=0.5324$ | | |
| $R_3=+47.916$ | $d_2=8.5183$ | $n_2=1.6930$ | $\nu_2=53.3$ |
| $R_4=+1,064.8$ | $a_2=10.648$ | | |
| $R_5=-67.082$ | $d_3=3.7268$ | $n_3=1.7050$ | $\nu_3=30.1$ |
| $R_6=+47.916$ | $a_3=11.180$ | | |
| $R_7=+198.05$ | $d_4=6.9211$ | $n_4=1.7300$ | $\nu_4=44.5$ |
| $R_8=-51.429$ | | | |

4. An objective as claimed in claim 1 in which said first lens and the rear lens are made of glass having a refraction index in excess of 1.70.

5. An objective as claimed in claim 1 in which, for a focal length of $f=100$ mm., and wherein the radii of curvature may vary by ±20% and the surface refractive powers by ±20%, the objective has the following physical data:

| | | | |
|---|---|---|---|
| $R_1=+160.45$ | $d_1=7.488$ | $n_1=1.7257$ | $\nu_1=50.3$ |
| $R_2=+218.86$ | $a_1=0.535$ | | |
| $R_3=+48.136$ | $d_2=8.557$ | $n_2=1.6892$ | $\nu_2=54.6$ |
| $R_4=+1,069.7$ | $a_2=10.697$ | | |
| $R_5=-63.12$ | $d_3=3.744$ | $n_3=1.6983$ | $\nu_3=30.0$ |
| $R_6=+50.84$ | $a_3=11.232$ | | |
| $R_7=+218.86$ | $d_4=5.0$ | $n_4=1.7257$ | $\nu_4=50.3$ |
| $R_8=-51.02$ | | | |

6. An objective as claimed in claim 1 in which said first lens has the least thickness, and its glass has the lowest refractive index, of all of the four lenses.

7. An objective as claimed in claim 1 in which, for a focal length of $f=100$ mm., and wherein the radii of curvature may vary by ±20% and the surface refractive powers by ±20%, the objective has the following physical data:

| | | | |
|---|---|---|---|
| $R_1=+156.27$ | $d_1=2.71$ | $n_1=1.5687$ | $\nu_1=63.1$ |
| $R_2=+286.75$ | $a_1=1.01$ | | |
| $R_3=+45.16$ | $d_2=8.64$ | $n_2=1.6211$ | $\nu_2=62.1$ |
| $R_4=+502.61$ | $a_2=12.26$ | | |
| $R_5=-80.38$ | $d_3=4.22$ | $n_3=1.6483$ | $\nu_3=33.8$ |
| $R_6=+39.91$ | $a_3=13.16$ | | |
| $R_7=+130.75$ | $d_4=7.44$ | $n_4=1.6935$ | $\nu_4=53.4$ |
| $R_8=-56.19$ | | | |

References Cited by the Examiner

UNITED STATES PATENTS 2,399,858   5/46   Cox _____ 88—57
2,574,995   11/51  Aklin _____ 88—57
2,747,466   5/56   Orser.

FOREIGN PATENTS 186,917   11/23   Great Britain.

JEWELL H. PEDERSEN, *Primary Examiner.*
WILLIAM MISIEK, *Examiner.*